Oct. 18, 1927.
L. J. LANE
1,645,812
PROCESS FOR THE MANUFACTURE OF SPLIT BAMBOO FISHING RODS
Filed Sept. 24, 1925
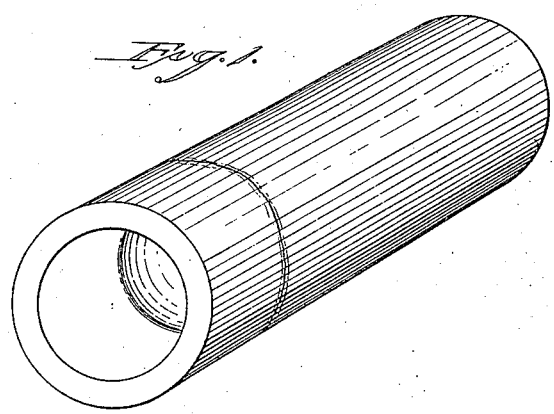
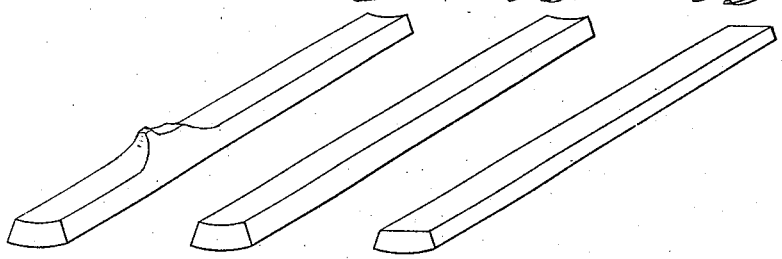
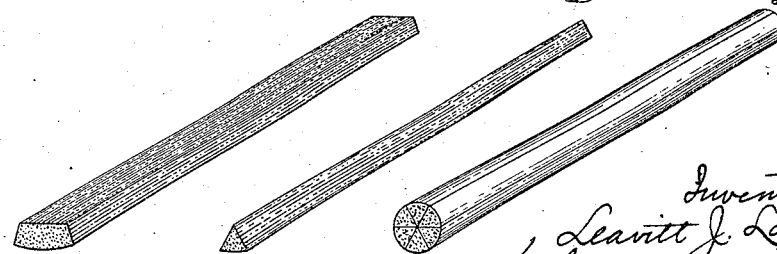

Patented Oct. 18, 1927.

1,645,812

UNITED STATES PATENT OFFICE.

LEAVITT J. LANE, OF HAMDEN, CONNECTICUT, ASSIGNOR TO WINCHESTER REPEATING ARMS CO., OF NEW HAVEN, CONNECTICUT, A CORPORATION.

PROCESS FOR THE MANUFACTURE OF SPLIT-BAMBOO FISHING RODS.

Application filed September 24, 1925. Serial No. 58,385.

My invention relates to an improved process of preparing and treating bamboo or similar material for the manufacture of so-called "split bamboo" fishing-rods. My invention is characterized by the fact that the bamboo or similar material, after being split into strips and planed to approximately the desired thickness, is subjected for a specified length of time to the action of water and heat under certain definite pressure, whereby I am enabled to produce split-bamboo fishrods having increased strength, stiffness and elasticity in proportion to their weight. It is also characterized by the fact that the material so treated is darkened throughout to a rich handsome color.

An object of my invention is to provide for the manufacture of split-bamboo fishingrods which shall be stiffer, stronger and more elastic in proportion to their weight and also enhanced in attractiveness of appearance by virtue of having a substantially uniform, rich, darkened color.

A further object of my invention is to subject the material to a treatment which will cause the adhesion of the several parts of the rod to each other to be greatly increased.

In the accompanying drawings:

Fig. 1 represents a piece of bamboo of the required length for the prosecution of my improved process;

Fig. 2 is a perspective view of a strip sawed from the piece of bamboo shown in Fig. 1;

Fig. 3 is a perspective view of the same strip, after its inner face has been roughplaned to remove the knotty projection thereupon caused by the natural septum in the cane;

Fig. 4 is a corresponding view of the same strip, after its inner surface has been smoothplaned and its outer surface ground off;

Fig. 5 is a corresponding view of the same strip after it has been hardened, stiffened, made more elastic and more porous, and enriched in color by its prolonged subjection to the action of water and heat under pressure;

Fig. 6 is a corresponding view of the triangular rod-sector derived from cutting down the strip shown in Fig. 5 after the same has been cooled and dried; and Fig. 7 is a perspective view of a fishingrod section composed of six such sectors as shown in Fig. 6 glued together.

In carrying out my invention, as herein shown, I employ preferably the variety of bamboo known as "Tonkin." This material I first cut into lengths (Fig. 1) slightly longer than I intend the joint sections (Fig. 7) of the finished fishing rod to be. These lengths I then saw lengthwise into strips (Fig. 2) of an appropriate width. I then match together six of these strips which are destined to be used together in the manufacture of a single fishing-rod joint.

Each such strip is then rough planed on its inner surface (Fig. 3) to remove the knotty projections (Fig. 2) thereon derived from the natural internal septa of the cane. It is then subjected to a grinding process (not shown) on the exterior to smooth off the roughness due to the external knots of the cane.

Each strip is then planed on its interior surface (Fig. 4) to remove the soft, pithy interior layer. After this process the six strips above mentioned are tied loosely together, in order to keep them associated and, together with a certain number of similar bunches of similar strips, are placed in a suitable device, and then subjected to the influence of steam at a pressure of approximately one hundred pounds for a period of about twenty-five minutes. I find that this pressure and length of time are the optimum combination, but may be varied within a considerable range, the necessary time to produce the desired result being roughly inversely proportionate to the steam pressure.

At the end of the specified time the strips of material are removed from the steam and permitted to dry and cool in the open air. These strips of material (Fig. 5) are characterized now by a uniformly dark color throughout their entire body, by the fact that a considerable portion of the natural resin or gum and sugar and similar soluble materials have been removed from the fibres thereof and by an increased stiffness and hardness without loss of toughness or elasticity. The strips are now sawed to produce the ultimate triangular sectors (Fig. 6) which are glued together in the customary manner, superior adhesion being secured between them owing to the easy entrance of the glue into the substantiallyempty pores of the material, due to its subjection, as described, to the action of water and heat under pressure. Furthermore, if there is any fermentation of the juices of the cane, owing to storage under poor conditions, the acid and other products of such fermentation, which are in time destructive to the useful life of the cane, are removed before the material is made up.

Not only are the individual strips of material increased in stiffness and hardness, but also when the strips are glued together the joint sections thus formed have an increased stiffness and elasticity, due to the replacement of the natural resin, gums, sugars, and similar materials by the much harder glue.

After the strips have been removed from the steam and sufficiently dried and cooled, each strip is, in the usual manner, sawed to have an equilaterally-triangular cross section. The six associated strips are then carefully matched, tested, glued together, and made up into a fishing-rod joint section in the customary manner.

I have discovered that as a variant of my process, it is possible to produce substantially the same results by subjecting the material to the action of boiling water for a period of time and thereafter driving off the water by heat, as, for example, in a drying oven or on a hot plate.

I claim:

A process for manufacturing fishing-rods from bamboo or similar material, comprising the following steps: Subjecting the material to the prolonged action of water and heat under pressure; then cooling and drying it; then forming it into suitable rod-sectors; and then assembling and gluing such rod-sectors, whereby the material is hardened, increased in elasticity, stiffness and porosity, and enriched in color.

In testimony whereof, I have signed this specification.

LEAVITT J. LANE.